(12) United States Patent
Kanda

(10) Patent No.: US 8,081,998 B2
(45) Date of Patent: Dec. 20, 2011

(54) COMMUNICATION APPARATUS AND COMMUNICATION CONTROL METHOD WITH POWER ADJUSTMENT TO AVOID INTERFERENCE BETWEEN APPARATUSES ON FIRST AND SECOND NETWORKS

(75) Inventor: Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 12/180,032

(22) Filed: Jul. 25, 2008

(65) Prior Publication Data

US 2009/0047988 A1 Feb. 19, 2009

(30) Foreign Application Priority Data

Aug. 14, 2007 (JP) .................................. 2007-211502

(51) Int. Cl.
*H04B 7/00* (2006.01)

(52) U.S. Cl. ........ 455/522; 455/69; 455/13.4; 455/63.1; 455/114.2; 455/296; 455/502; 455/67.13; 370/318; 340/10.1

(58) Field of Classification Search .................. 455/522, 455/69, 13.4, 127.1–127.5, 63.1, 114.2, 296, 455/501–502, 67.11, 67.13; 370/318, 335; 713/320; 340/10.1, 426.2, 10.34
See application file for complete search history.

(56) References Cited

U.S. PATENT DOCUMENTS

| | | | | |
|---|---|---|---|---|
| 5,898,927 A | * | 4/1999 | Ishii et al. ...................... | 455/450 |
| 6,614,771 B1 | | 9/2003 | Kim et al. | |
| RE40,253 E | * | 4/2008 | Kim .............................. | 370/335 |
| 7,720,502 B2 | * | 5/2010 | Suga et al. ..................... | 455/522 |
| 7,782,987 B2 | * | 8/2010 | Jonsson ......................... | 375/348 |
| 7,835,384 B2 | * | 11/2010 | Furuskar et al. .............. | 370/445 |
| 2002/0173330 A1 | * | 11/2002 | Kojima et al. ................ | 455/522 |
| 2006/0121928 A1 | * | 6/2006 | Itsuki ............................ | 455/522 |
| 2007/0159301 A1 | * | 7/2007 | Hirt et al. ..................... | 340/10.1 |
| 2007/0286143 A1 | * | 12/2007 | Olson et al. .................. | 370/338 |

FOREIGN PATENT DOCUMENTS

| | | |
|---|---|---|
| JP | 2002-271263 | 9/2002 |
| JP | 2004-242076 | 8/2004 |
| JP | 2005-328231 | 11/2005 |
| WO | 2006-085365 A1 | 8/2006 |

OTHER PUBLICATIONS

The above references were cited in a Jul. 20, 2011 Chinese Office Action, which is enclosed with an English Translation, that issued in Chinese Patent Application No. 200810145751.7.

* cited by examiner

*Primary Examiner* — Shaima Q Aminzay
(74) *Attorney, Agent, or Firm* — Cowan, Liebowitz & Latman, P.C.

(57) ABSTRACT

A communication control technique that makes it possible to avoid interference with another wireless communication system. To realize this technique, a tributary station according to the present invention transmits a beacon in an asynchronous BP after being started up, thereby determining whether or not another wireless communication network has received that beacon, and in the case where it has been determined that the other wireless communication network has received the beacon, the tributary station decreases its transmission power until the beacon is no longer received by the other wireless communication network.

14 Claims, 11 Drawing Sheets

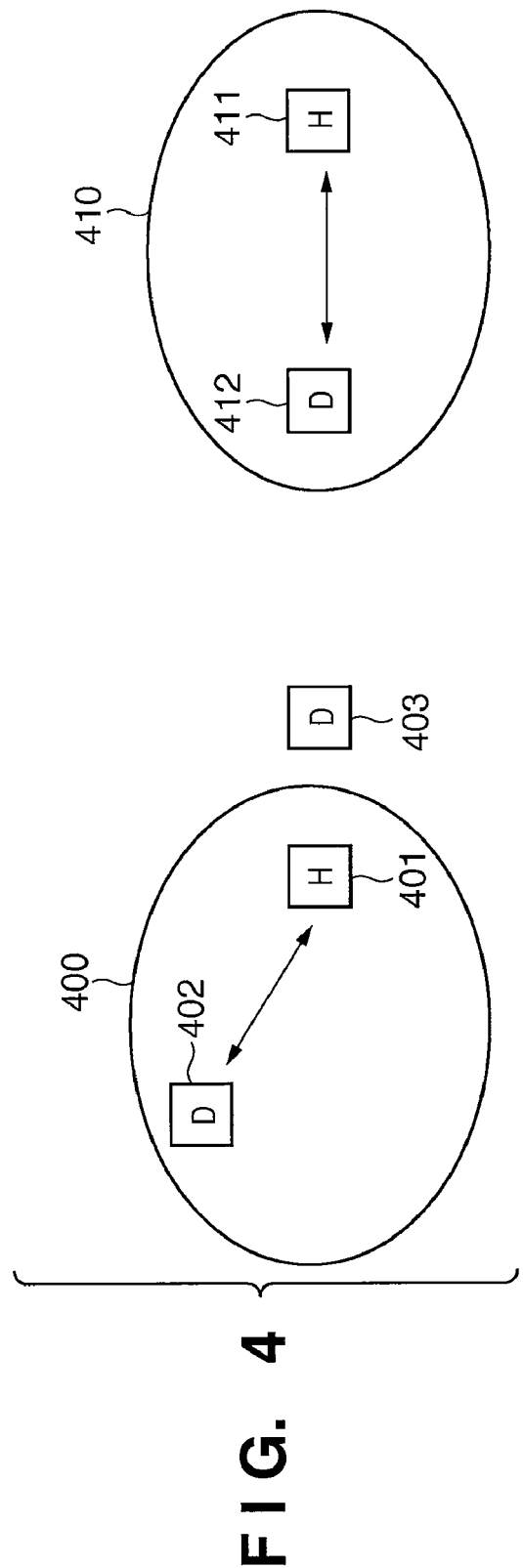

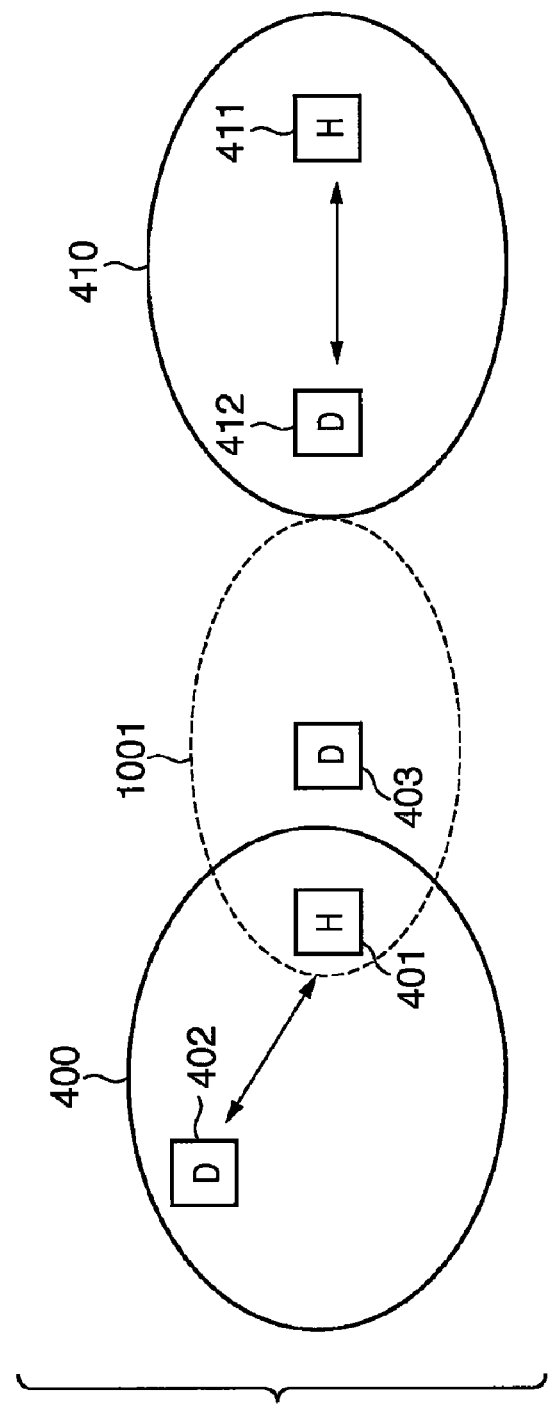
F I G. 10

COMMUNICATION APPARATUS AND COMMUNICATION CONTROL METHOD WITH POWER ADJUSTMENT TO AVOID INTERFERENCE BETWEEN APPARATUSES ON FIRST AND SECOND NETWORKS

BACKGROUND OF THE INVENTION

1. Field of the Invention

The present invention relates to a technique for controlling communication within a network.

2. Description of the Related Art

A scheme that wirelessly connects devices located at very close range (such as 10 or so meters) to one another is called a WPAN, and is defined separately from WLAN.

At present, ECMA International, a standardization association, provides the Standard ECMA-368, which specifies physical layer and MAC layer specifications as a standard for WPAN using a UWB (Ultra Wide-Band) communication system. The Standard ECMA-368 furthermore specifies standards such as the Wireless USB standard as the protocol operating on the upper layer.

In the UWB communication scheme, the timing at which each wireless terminal accesses another wireless terminal is controlled in order to prevent wireless frame "collisions", which occur when multiple wireless terminals transmit wireless frames simultaneously. The Media Access Control (MAC) protocol is the protocol that determines this control scheme, and implements this control through the transmission and reception of beacons.

"Interference" between wireless communication systems caused by shared frequencies presents a problem when the UWB communication scheme is used.

Reducing the transmission power of wireless terminals within the respective wireless communication systems is useful as a way to suppress the occurrence of "interference" between wireless communication systems.

In addition, various schemes for controlling the transmission power in wireless communication systems in order to conserve energy have been conventionally proposed.

For example, Japanese Patent Laid-Open No. 2005-328231 proposes a scheme in which the transmission power of a wireless terminal is progressively increased, and the transmission power level at the point in time when a link established signal has been received from an access point is set as the level to be used in subsequent data communication.

Furthermore, Japanese Patent Laid-Open No. 2002-271263 proposes a scheme in which a control station notifies a terminal station of an estimated lower limit reception power value at which the control station itself is capable of reception, and the terminal station sets its own transmission power using the estimated lower limit value as a reference.

However, both of the stated patent documents aim to control transmission power through the identification of the transmission power level necessary to maintain communication between the original terminal itself and the other wireless terminals within the wireless communication system. In other words, the stated patent documents do not aim to actively avoid "interference" with other wireless communication systems, and thus the avoidance of "interference" with other wireless communication systems cannot be guaranteed when carrying out communication using controlled transmission power.

SUMMARY OF THE INVENTION

It is desirable to overcome one or more the problems stated above. It is also desirable to reduce interference with other networks.

A communication apparatus according to the present invention includes: a first determination unit configured to determine whether or not a signal transmitted from another network has been received; a transmission unit configured to transmit a signal to the other network in the case where the first determination unit has determined that a signal has been received from the other network; a second determination unit configured to determine whether or not the signal transmitted by the transmission unit has been received by a communication apparatus in the other network, based on a signal received from the other network after the transmission performed by the transmission unit; and a control unit configured to control the transmission power based on the result of the determination performed by the second determination unit.

Meanwhile, a communication control method according to the present invention includes: determining whether or not a signal transmitted from another network has been received; transmitting a signal to the other network in the case where it has been determined that a signal has been received from the other network; determining whether or not the signal transmitted to the other network has been received by a communication apparatus in the other network, based on a signal received from the other network after the transmission of the signal; and controlling the transmission power based on the result of the determination of whether or not the signal transmitted to the other network has been received.

In an embodiment of the present invention, interference with other networks can be reduced.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings:

FIG. 4 is a diagram illustrating the configuration of a group of wireless communication networks formed by wireless terminals according to a first embodiment of the present invention.

FIG. 5 is a diagram illustrating timings according to the MAC protocol.

FIG. 10 is a diagram illustrating the wireless frame range of a Wireless USB device 403 whose transmission power is controlled through a transmission power control process.

DESCRIPTION OF THE EMBODIMENTS

Preferred embodiments of the present invention shall now be described in detail in accordance with the accompanying drawings.

Note that the following descriptions discuss a case where the Wireless USB standard is used as an example of a wireless communication network that uses UWB. The present invention is, of course, not intended to be limited thereto, and other applications may be utilized instead.

Furthermore, in the following descriptions, "control station" refers to a terminal that controls communication when a wireless communication network has been created in a wireless communication system; in the case of the Wireless USB (Universal Serial Bus) standard, the control station is the Wireless USB host. Meanwhile, "tributary station" refers to a terminal that communicates under the control of the control station of a wireless communication system, and in the case of the Wireless USB standard, the tributary station is a Wireless USB device. Control stations and tributary stations shall be referred to collectively as "wireless terminals".

First Embodiment

1. Description of Wireless Superframes in UWB MAC Protocol

First, descriptions shall be provided regarding the structure of a wireless superframe as specified by the MAC protocol in the UWB communication system.

(1) Overall Structure of Wireless Superframe

Figure 1:
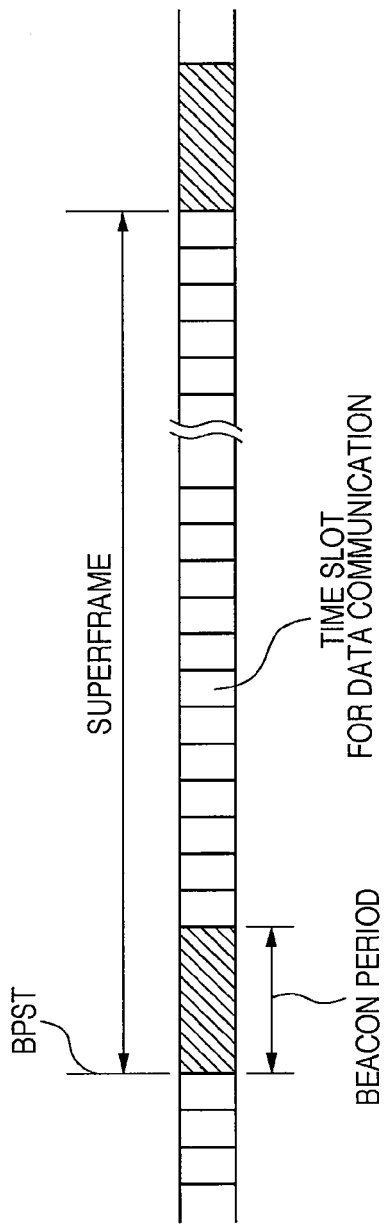
FIG. 1 is a diagram illustrating the structure of a wireless superframe as specified by the MAC protocol.

FIG. 1 is a diagram illustrating the overall structure of a wireless superframe as specified by the MAC protocol. According to the MAC protocol, the timing of accesses between wireless terminals is controlled using a superframe, which is of a fixed time length and is repeatedly generated, as a reference.

The time length of the superframe is approximately 65 milliseconds, and the superframe is divided into 256 timeslots at equal intervals. Which of these timeslots can be used as data communication timeslots, used in data communication, is settled by wireless terminals transmitting and receiving control signals called "beacons" to and from one another.

One or more timeslots located at the beginning of the superframe are secured as a region that the wireless terminal uses to transmit the beacon, and this region is called a "beacon period".

(2) Structure of Beacon Period Included in Wireless Superframe

Figure 2:
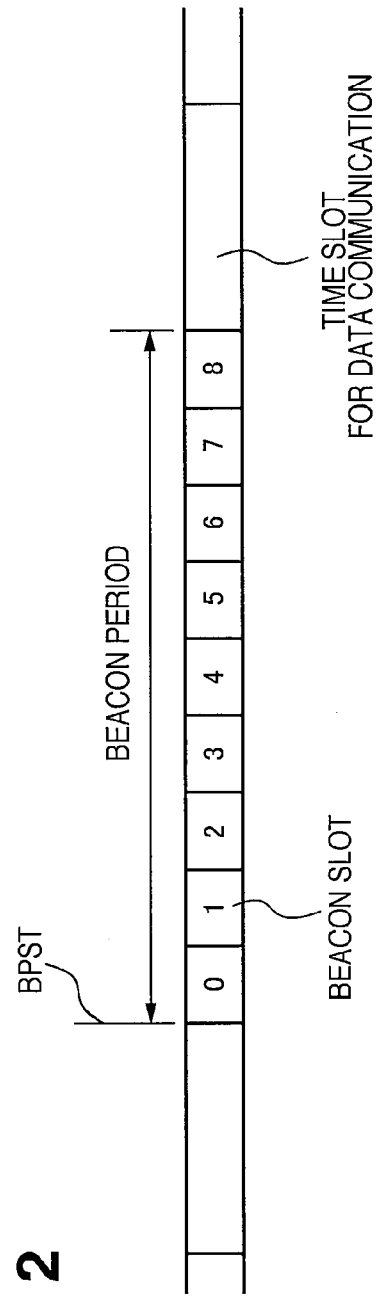
FIG. 2 is a diagram illustrating the structure of a beacon period included in the wireless frame.

FIG. 2 is a diagram illustrating the structure of the beacon period included in the wireless superframe. The beacon period is configured of a plurality of beacon slots that has a length of approximately 85 microseconds. The length of the beacon period is dependent on the number of wireless terminals, and is thus variable.

The start time of the beacon period is called a BPST (Beacon Period Start Time). This BPST can also be considered the start time of the superframe.

Multiple wireless terminals that form a single wireless communication network all share the same BPST, which corresponds to the start time of the superframe; the beacons sent by each wireless terminal are structured as follows.

(3) Beacon Structure

Figure 3:
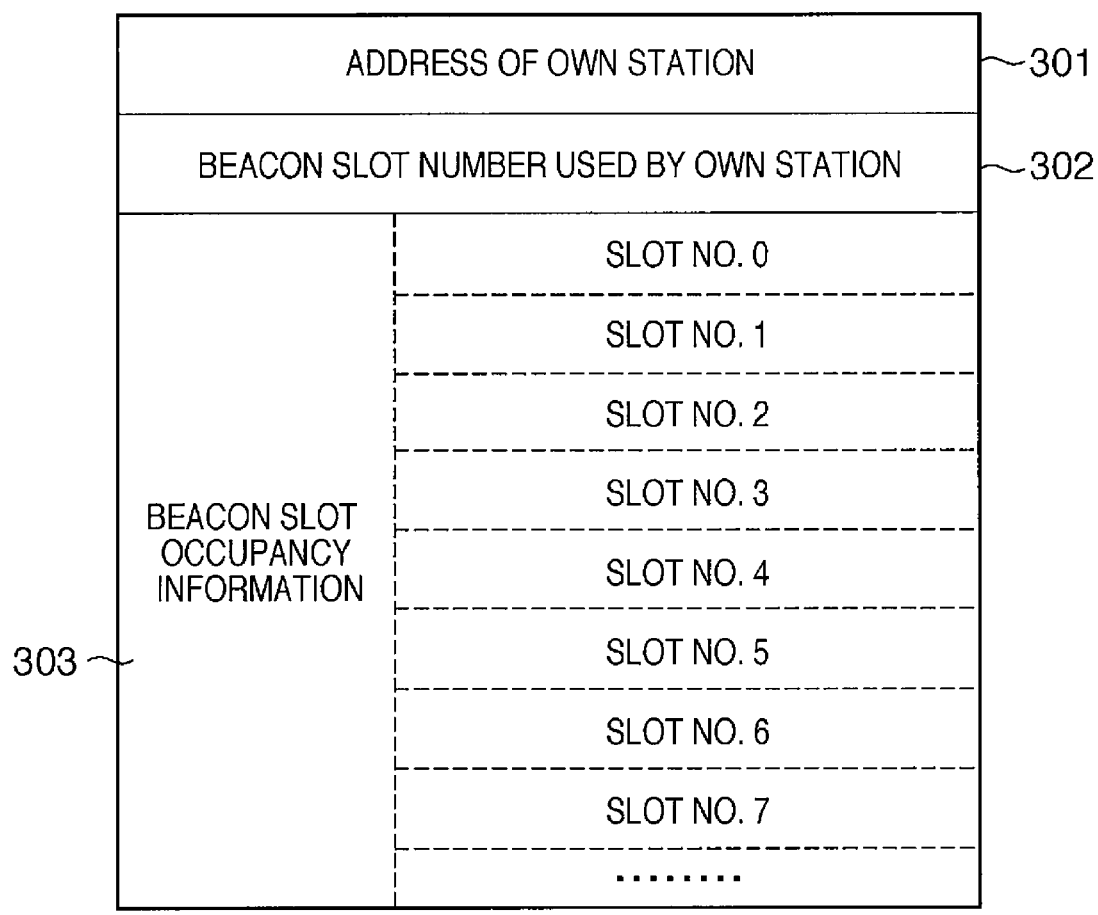
FIG. 3 is a schematic diagram illustrating the structure of a beacon transmitted in accordance with the MAC protocol.

FIG. 3 is a schematic diagram illustrating the structure of a beacon transmitted in accordance with the MAC protocol. As shown in FIG. 3, the beacons belonging to each wireless terminal include an address of that terminal and a beacon slot number used by that terminal for beacon transmission (301 and 302).

Another terminal that has received a beacon analyzes the details of that beacon and can calculate the BPST recognized by the terminal that transmitted the beacon based on the time at which the beacon was actually received and the beacon slot number (302) included in the beacon.

Because a wireless terminal can evaluate the BPST recognized by the other wireless terminals, the terminals can access one another in synchronization by using the BPST as the reference start point of the superframe.

Furthermore, the beacons belonging to each wireless terminal also include beacon slot occupancy information 303, which stores the addresses of other recognized wireless terminals on a slot number-by-slot number basis. Through this, it is possible to avoid collisions in beacon slots.

With respect to the information included in the beacon, it should be noted that the example in FIG. 3 shows only the items required for describing the present embodiment. Although FIG. 3 thus differs from the frame format of the beacon that is actually specified in the Standard ECMA-368, this is not to imply that the information aside from that shown in FIG. 3 has been discarded.

2. Wireless Communication System Configuration

FIG. 4 is a diagram illustrating the configuration of a group of wireless communication networks formed by wireless terminals according to a first embodiment of the present invention. The wireless terminals illustrated in FIG. 4 form wireless communication networks 400 and 410, respectively, through UWB Wireless USB.

As shown in FIG. 4, 401 is a Wireless USB host (control station), and 402 is a Wireless USB device (tributary station), and the two of these together form the wireless communication network 400. Similarly, 411 is a Wireless USB host (control station), and 412 is a Wireless USB device (tributary station), and the two of these together form the wireless communication network 410, which is different from the wireless communication network 400.

Note that a Wireless USB device 403, which is not running, is located between the wireless communication networks 400 and 410. Starting up the Wireless USB device 403 connects it to the wireless communication network 400 as a tributary station.

The Wireless USB device 402 present in the wireless communication network 400 and the Wireless USB device 412 present in the wireless communication network 410 are located far from one another, and thus not only can these devices not communicate with one another, but their respective wireless frames will also not collide with one another. To be more specific, the wireless communication networks 400 and 410 are configured in the following manner, with respect to one another.

First, the wireless communication network 400 and the wireless communication network 410 set the BPST and beacon period of their respective superframes to occur at different points in time, as illustrated in FIG. 5. Such a relationship is called "asynchronous", and data is not communicated among wireless terminals asynchronously.

Figure 6:
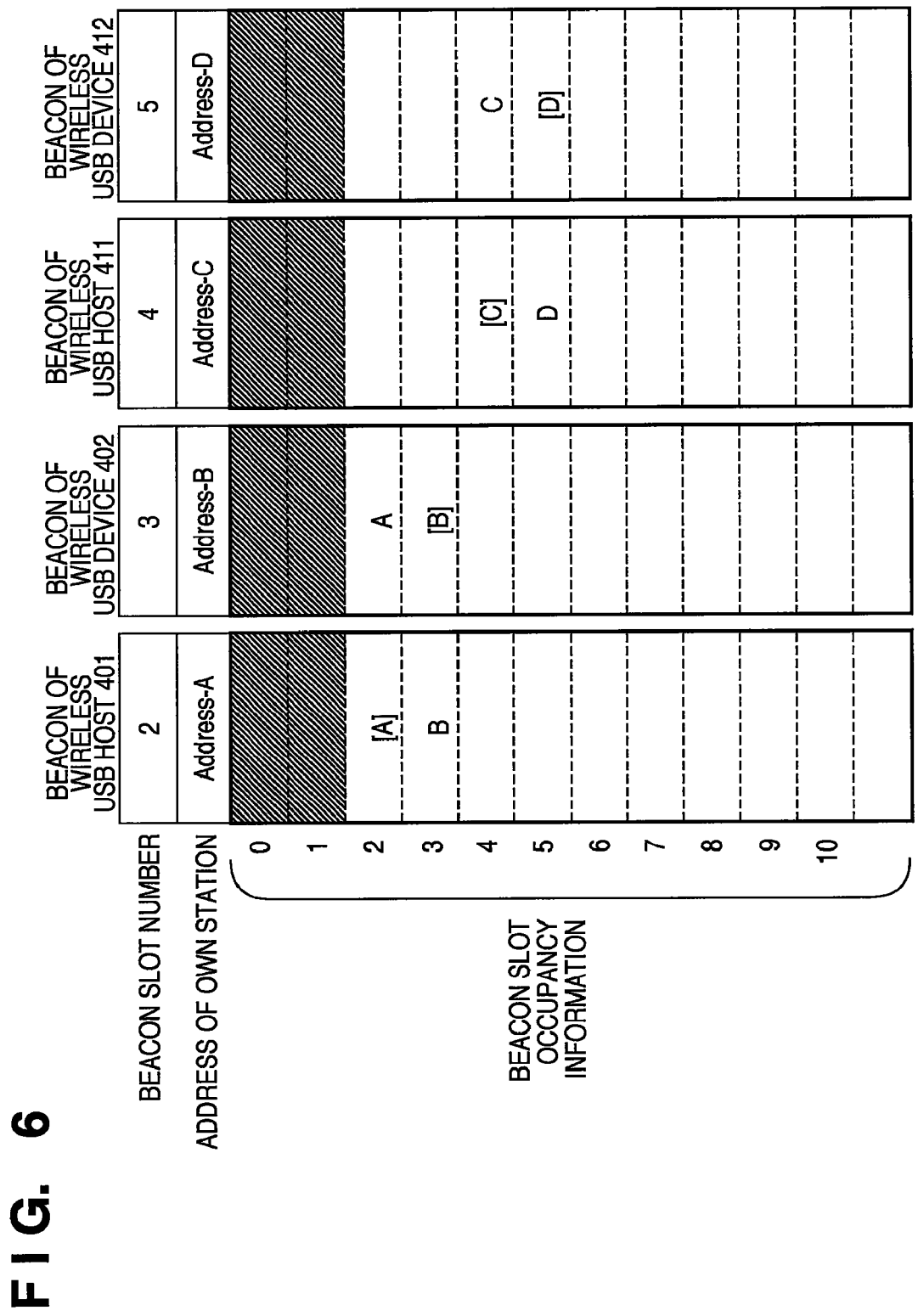
FIG. 6 is a diagram illustrating an example of beacon setting details.

Meanwhile, the beacons transmitted by the respective wireless terminals are set as illustrated in FIG. 6. In other words, second to fifth different beacon slots are allocated to the Wireless USB hosts and Wireless USB devices (401, 402, 411, and 412), respectively.

The reason that the 0th and first beacon slots are not used is because those two beacon slots are used for other purposes, such as optimization of the beacon period length, under the ECMA-368 Standard. This, however, is of no essential relation to the present invention.

Because the Wireless USB host 401 receives the beacon of the Wireless USB device 402, the address of that device is stored in slot number 3 as the beacon slot occupancy information, as illustrated in FIG. 6. Furthermore, the Wireless USB host 401 sending its own beacon stores its own address in beacon slot number 2, and the fields corresponding to the other slot numbers are left empty.

Similarly, because the Wireless USB host 411 receives the beacon of the Wireless USB device 412, the address of the Wireless USB device 412 is stored in slot number 5 as the beacon slot occupancy information. Furthermore, the Wireless USB host 411 sending its own beacon stores its own address in slot number 4, and the fields corresponding to the other slot numbers are left empty.

Collisions between wireless frames transmitted by the wireless terminals are avoided through such beacon settings.

3. Internal Configuration of Tributary Station

Figure 7:
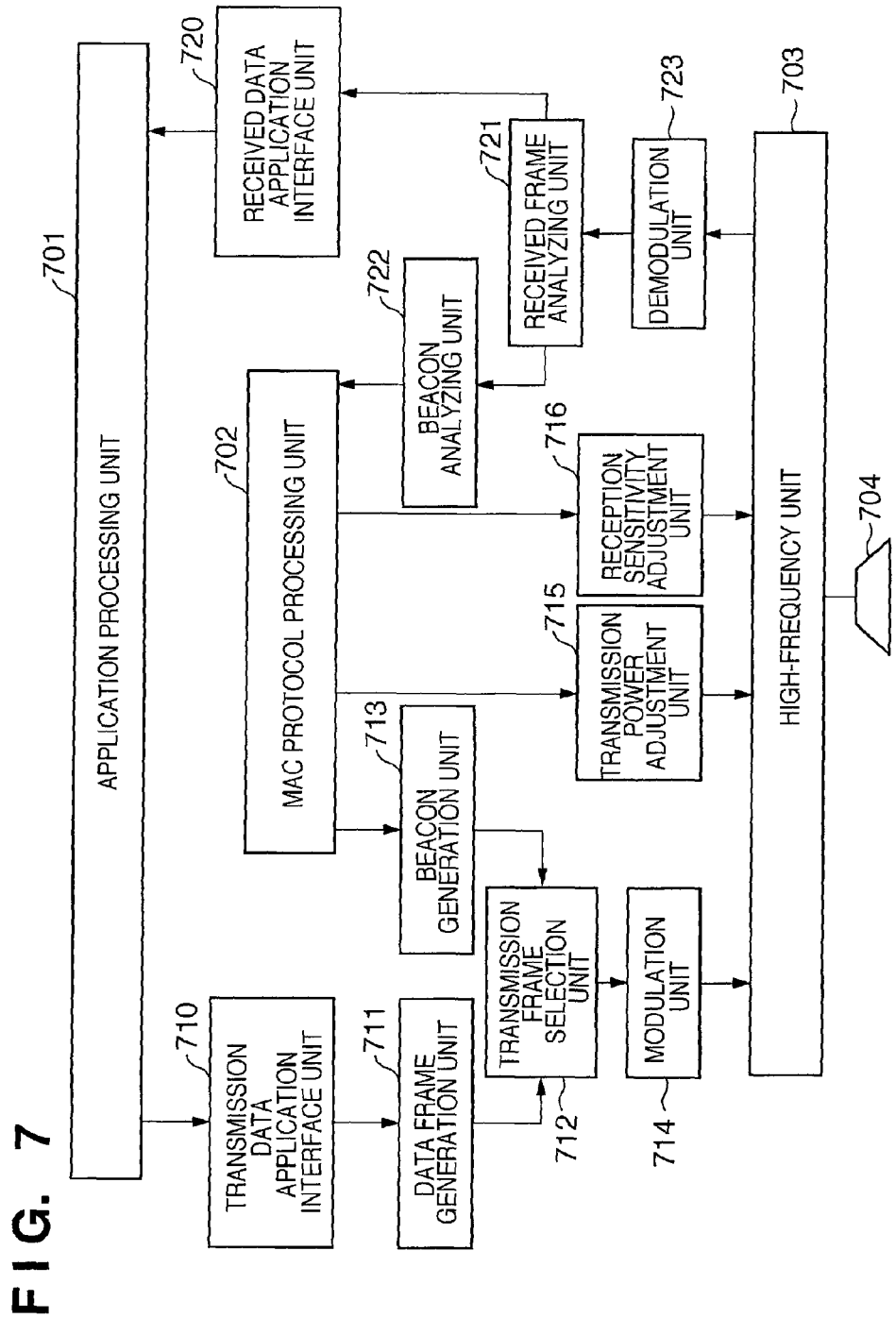
FIG. 7 is a diagram illustrating an example of the internal configuration of a tributary station.

FIG. 7 is a diagram illustrating an example of the internal configuration of a tributary station, and the operations of the various elements that make up the tributary station shall be briefly described hereinafter with reference to FIG. 7. Although the Wireless USB device 403 is described as the tributary station here, it should be noted that the Wireless USB devices 402 and 412 also have the same internal configurations.

Among the wireless frames transmitted and received by the Wireless USB device 403, there are "beacon frames" and "data frames".

Transmission and reception of data frames is executed according to the following procedure. First, the application data to be transmitted is transferred from an application processing unit 701 to a data frame generation unit 711 via a transmission data application interface unit 710. Next, the application data is converted by the data frame generation unit 711 into data frames in a format suitable for wireless communication.

After this, upon being selected by a transmission frame selection unit 712, these data frames are converted into an analog signal by a modulation unit 714, which in turn is converted into a wireless signal by a high-frequency unit 703; the wireless signal is then transmitted to other wireless terminals using an antenna 704.

Meanwhile, data frames received through the antenna 704 and converted into a baseband signal or a digital signal by the high-frequency unit 703, which is then data-demodulated by a demodulation unit 723 and sent to a received frame analyzing unit 721.

If the received frame analyzing unit 721 determines that the input wireless frames are data frames, it converts the data frames into an appropriate format as application data. Then, the application data is passed to the application processing unit 701 via a received data application interface unit 720.

On the other hand, a MAC protocol processing unit 702 is used in the transmission and reception of beacon frames. For example, when the Wireless USB device 403 receives a beacon frame, a beacon analyzing unit 722 takes the received beacon from the received frame analyzing unit 721 and analyzes the timing of the reception, the information held within the beacon, and so on.

The address of the wireless terminal that transmitted the beacon, the beacon slot number in which the beacon was transmitted, the beacon slot occupancy information, and so on are included in the information regarding the beacon.

Having taken the information regarding the beacon, the MAC protocol processing unit 702 executes the beacon protocol and selects the number of the beacon slot in which its own station is to transmit the beacon. The MAC protocol processing unit 702 transfers information regarding the beacon received by its own station to a beacon generation unit 713, along with the beacon slot number selected as described above.

The beacon generation unit 713 generates the beacon to be transmitted based on this information. The transmission frame selection unit 712 then sends the beacon frame for transmission, received from the beacon generation unit 713, to the modulation unit 714, at a timing instructed by the beacon generation unit 713.

After this, the beacon passes through the high-frequency unit 703 and is then transmitted from the antenna 704 to other wireless terminals.

The Wireless USB device 403, meanwhile, further includes a transmission power adjustment unit 715 and a reception sensitivity adjustment unit 716. The transmission power adjustment unit 715 has a function for adjusting the power at which its own station transmits wireless frames. The reception sensitivity adjustment unit 716, meanwhile, has a function for adjusting the reception sensitivity of its own terminal when receiving wireless frames transmitted by other wireless terminals. Note that the transmission power adjustment unit 715 and the reception sensitivity adjustment unit 716 operate in accordance with instructions from the MAC protocol processing unit 702.

4. Description of Interference between Wireless Communication Systems

Figures 8A, 8B:
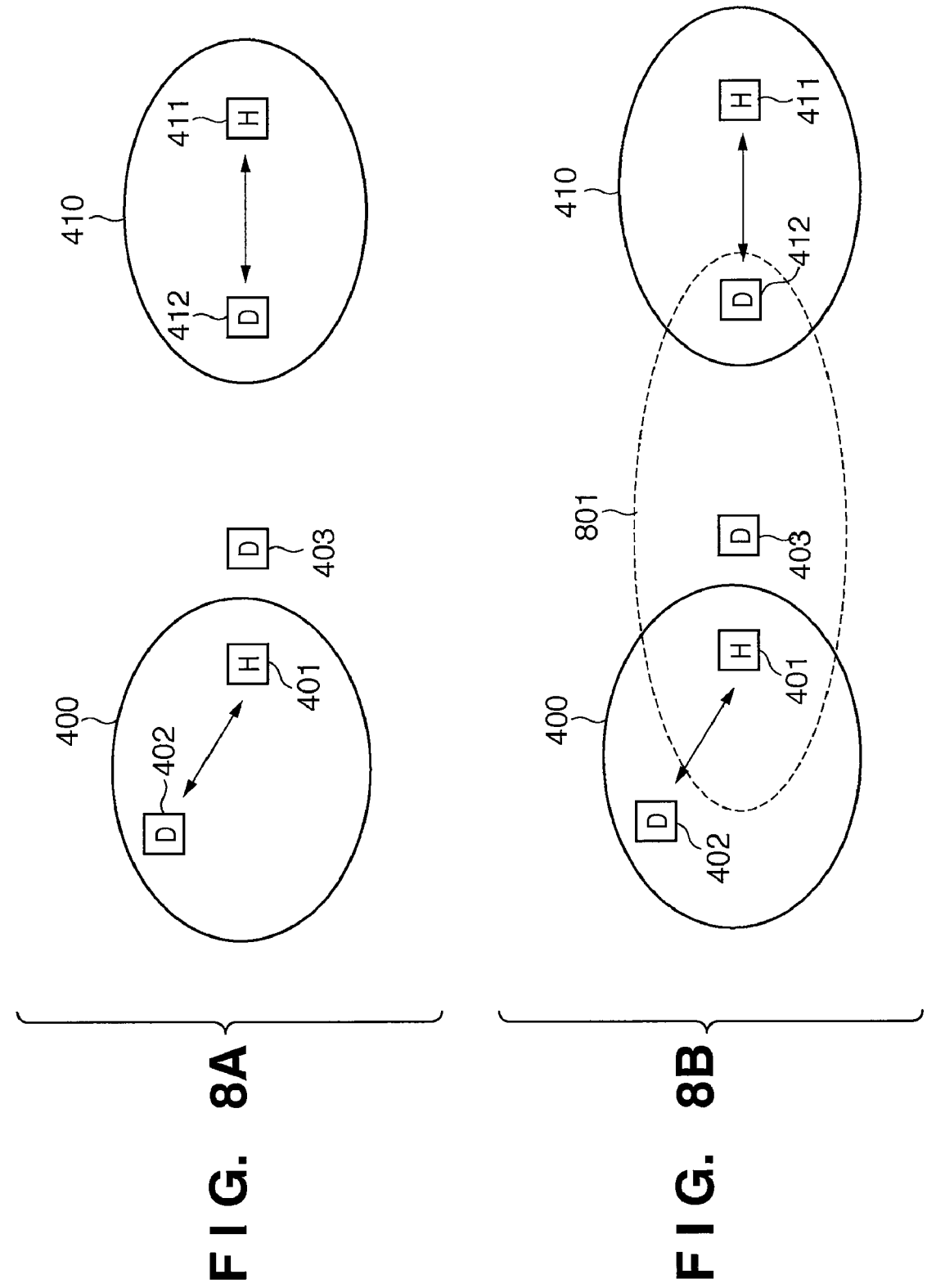
FIGS. 8A and 8B are diagrams illustrating interference between wireless communication networks 400 and 410.

FIGS. 8A and 8B are diagrams illustrating interference between wireless communication networks 400 and 410. As described with reference to FIG. 4, the Wireless USB device 402 present in the wireless communication network 400 and the Wireless USB device 412 present in the wireless communication network 410 are located far from one another. Not only can these devices not communicate with one another, but their respective wireless frames will also not collide with one another, and thus in this state, there is no interference between the two (FIG. 8A).

However, interference occurs between the wireless communication network 400 and the wireless communication network 410 when the Wireless USB device 403 is started up in this state. This shall be described in detail hereinafter.

The started Wireless USB device 403 first intercepts wireless frames, and detects whether or not a control station that it should connect to is present in the vicinity (here, that control station is the Wireless USB host 401).

Then, upon receiving wireless frames transmitted by the Wireless USB host 401, the Wireless USB device 403 determines that the Wireless USB host 401 is the control station that it should connect to.

The Wireless USB device 403 connects to the Wireless USB host 401 based on this determination.

And the Wireless USB device 403 also starts to transmit its own beacon, in the case that it is "Self Beaconing Device" defined by Wireless USB Specification.

In this case the Wireless USB device 403 refers to the same BPST with the Wireless USB host 401 and the Wireless USB device 402.

Here, the Wireless USB device 412 is located within a range 801 that the wireless frames transmitted by the Wireless USB device 403 reach, as illustrated in FIG. 8B. For this reason, the wireless frames transmitted by the Wireless USB device 403, such as beacons and the like, will interfere with the Wireless USB device 412.

In particular, the Wireless USB device 403 transmits not only beacons but also other wireless frames used in data communication, at a MAC protocol timing synchronized with the wireless communication network 400. For this reason, there is the possibility that all of these wireless frames will interfere with the wireless communication network 410 to which the Wireless USB device 412 belongs.

Accordingly, the Wireless USB device 403 of the present embodiment avoids interference with the wireless communication network 410 by controlling the transmission power at the time of startup. The flow of a transmission power control process performed by the Wireless USB device 403 at the time of startup shall be described in detail hereinafter.

5. Flow of Transmission Power Control Process by Tributary Station for Avoiding Interference FIG. 9 is a diagram illustrating the flow of the transmission power control process executed by the Wireless USB device 403 so that interference with the wireless communication network 410 does not occur due to the Wireless USB device 403 newly starting up.

Figure 9:
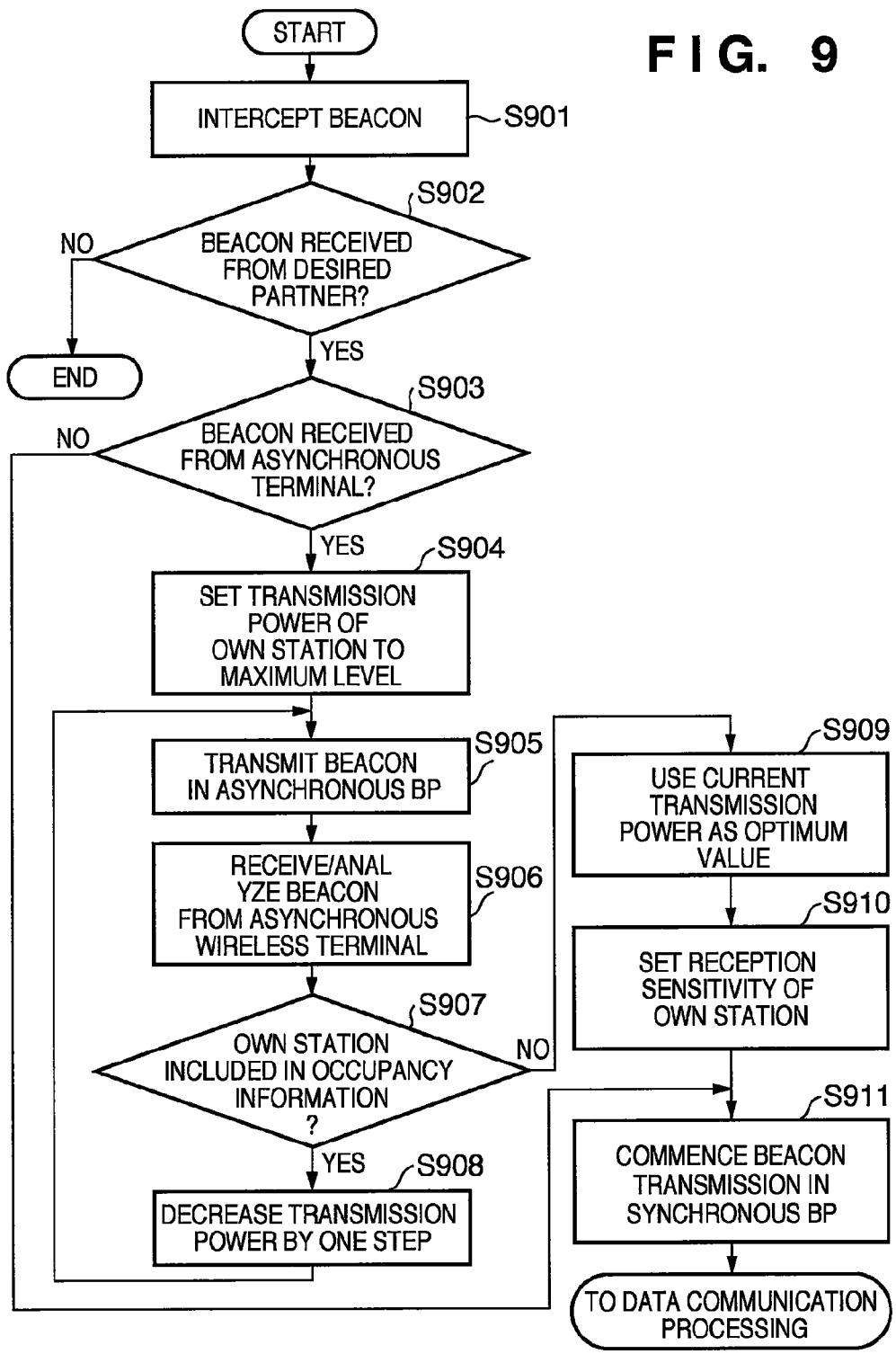
FIG. 9 is a diagram illustrating the flow of a transmission power control process executed by a tributary station according to the first embodiment of the present invention.

The process illustrated in FIG. 9 is executed when the Wireless USB device 403 is started up. In Step S901, in order to determine whether or not a partner to which it should connect is present, the Wireless USB device 403 first intercepts wireless frames for a set period following startup (a first reception means). The details of all received beacons are analyzed by the beacon analyzing unit 722.

In Step S902, based on the analysis results, it is determined whether or not a beacon has been received from the desired connection partner (the Wireless USB host 401, in the present embodiment) operating on the wireless communication network 400.

The transmission power control process ends if it has been determined that a beacon has not been received from the Wireless USB host 401 in Step S902.

However, the process advances to Step S903 if it has been determined that a beacon has been received from the Wireless USB host 401 in Step S902.

In Step S903, it is further determined whether or not a beacon has been received from a wireless terminal in the wireless communication network 410, which is operating asynchronously to the wireless communication network 400 (a first determination means). This wireless terminal is, for example, the Wireless USB device 412, in the present embodiment.

If in Step S903 it has been determined that a beacon has not been received from the Wireless USB device 412, there is no chance of interference with other wireless communication networks, and thus the process advances to Step S911.

However, if in Step S903 it has been determined that a beacon has been received from the Wireless USB device 412, there is a chance of interference with other wireless communication networks, and that interference should be avoided; thus the process advances to Step S904.

In Step S904, the MAC protocol processing unit 702 instructs the transmission power adjustment unit 715 to set the transmission power to the maximum level. The MAC protocol processing unit 702 also provides the timing at which to transmit a beacon and information necessary for beacon generation to the beacon generation unit 713.

It should be noted that the timing at which to transmit a beacon is determined by selecting a beacon slot included in an asynchronous BP (beacon period) used by the wireless communication network 410.

In Step S905, the beacon generation unit 713 generates a beacon using the provided information, and transmits the beacon at the stated transmission timing (a transmission means).

As a result of the processing performed in Step S905, another wireless terminal belonging to the wireless communication network 410 (for example, the Wireless USB device 412) receives the beacon transmitted by the Wireless USB device 403. The other wireless terminal then stores the address of the Wireless USB device 403 in the beacon slot occupancy information field included in the beacon it transmits itself. Note that the storage destination at this time is the field in the beacon slot occupancy information that corresponds to the number of the slot in which the beacon was received from the Wireless USB device 403. The beacon generated in this manner is transmitted from the Wireless USB device 412 to the Wireless USB device 403.

In Step S906, a beacon transmitted by another wireless terminal is received, and the beacon slot occupancy information included in the beacon transmitted by the other wireless terminal is analyzed (a second reception means).

In Step S907, it is determined whether or not information related to the Wireless USB device 403 is present in the beacon slot occupancy information (a second determination means). If it is determined that information related to the Wireless USB device 403 is present in the beacon slot occupancy information, the process advances to Step S908.

In Step S908, the Wireless USB device 403 determines that its own wireless frames are reaching a wireless terminal in the other wireless communication network 410, and reduces its own transmission power by one step.

After the transmission power has been reduced, the process returns to Step S905, where a beacon is once again transmitted in an asynchronous BP through the procedure described above. Thereafter, the processing from Steps S905 to S908 is repeated until it has been determined in Step S907 that information related to the Wireless USB device 403 is not present.

The transmission power of the Wireless USB device 403 is reduced by a step with each repetition of the processing from Steps S905 to S908. Eventually, this power will reach a level at which the wireless terminal in the other wireless communication network 410 is unable to receive the beacon transmitted by the Wireless USB device 403. In this case, the information related to the Wireless USB device 403 will no longer be present in the beacon slot occupancy information generated by the wireless terminal in the other wireless communication network 410 that could not receive the beacon from the Wireless USB device 403.

As a result, in Step S907, the Wireless USB device 403 determines that this information is not present in the beacon slot occupancy information generated by the wireless terminal in the other wireless communication network 410, and the process advances to Step S909.

In Step S909, the current transmission power is set in the transmission power adjustment unit 715 as the optimum value to apply in the data communication performed thereafter.

As shown in FIG. 10, upon the completion of these processes, a wireless terminal in the other wireless communication network 410 (that is, the Wireless USB device 412) is no longer present in a range 1001 that the wireless frames transmitted by the Wireless USB device 403 reach. As a result, the wireless frames transmitted by the Wireless USB device 403 do not interfere with the wireless terminal of the other wireless communication network 410.

The Wireless USB device 403, which has determined a transmission power optimum for not interfering with the wireless communication network 410, then ends beacon transmission in the asynchronous BP.

After this, in Step S910, the Wireless USB device 403 sets its own reception sensitivity to a level at which it will not detect wireless frames transmitted by a wireless terminal in the other wireless communication network 410.

Finally, in Step S911, the Wireless USB device 403 connects to the Wireless USB host 401 and commences data communication by commencing beacon transmission in a synchronous BP.

As described thus far, according to the transmission power control process of the present embodiment, it is possible to avoid having wireless frames transmitted by a tributary station interfere with a wireless terminal in another asynchronously-operating wireless communication network.

Second Embodiment

Although in the above first embodiment, transmission power control is executed while gradually reducing the transmission power of the Wireless USB device 403, the present invention is not intended to be limited thereto, and the transmission power control may be executed while gradually increasing the transmission power.

The flow of a transmission power control process performed by a tributary station according to the present embodiment in order to avoid interference shall be described hereinafter with reference to FIG. 11.

Figure 11:
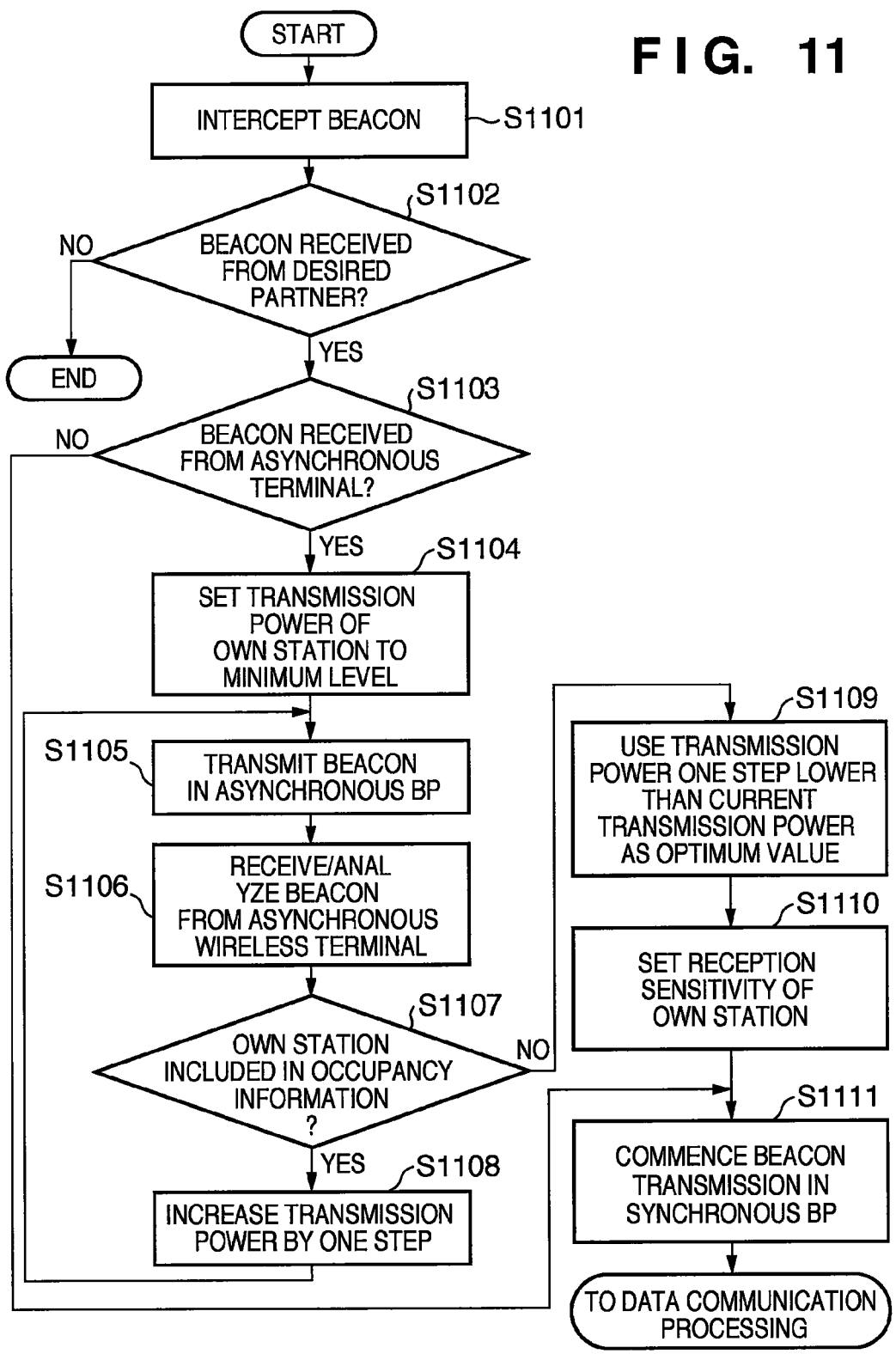
FIG. 11 is a diagram illustrating the flow of a transmission power control process executed by a tributary station according to a second embodiment of the present invention.

The process illustrated in FIG. 11 is executed when the Wireless USB device 403 is started up. In Step S1101, in order to determine whether or not a partner to which it should connect is present, the Wireless USB device 403 first intercepts wireless frames for a set period following startup. The details of all received beacons are analyzed by the beacon analyzing unit 722.

In Step S1102, based on the analysis results, it is determined whether or not a beacon has been received from the desired connection partner (the Wireless USB host 401, in the present embodiment) operating on the wireless communication network 400.

The transmission power control process ends if it has been determined that a beacon has not been received from the Wireless USB host 401 in Step S1102.

However, the process advances to Step S1103 if it has been determined that a beacon has been received from the Wireless USB host 401 in Step S1102.

In Step S1103, it is further determined whether or not a beacon has been received from a wireless terminal belonging to the wireless communication network 410, which is operating asynchronously to the wireless communication network 400. This wireless terminal is, for example, the Wireless USB device 412, in the present embodiment.

If in Step S1103 it has been determined that a beacon has not been received from the Wireless USB device 412, there is no chance of interference with other wireless communication networks, and thus the process advances to Step S1111.

However, if in Step S1103 it has been determined that a beacon has been received from the Wireless USB device 412, there is a chance of interference with other wireless communication networks, and that interference should be avoided; thus the process advances to Step S1104.

In Step S1104, the MAC protocol processing unit 702 instructs the transmission power adjustment unit 715 to set the transmission power to the minimum level. The MAC protocol processing unit 702 also provides the timing at which to transmit a beacon and information necessary for beacon generation to the beacon generation unit 713.

It should be noted that the timing at which to transmit a beacon is determined by selecting a beacon slot included in an asynchronous BP used by the wireless communication network 410.

In Step S1105, the beacon generation unit 713 generates a beacon using the provided information, and transmits the beacon at the stated transmission timing.

Here, if the current transmission power is insufficient to reach a wireless terminal in the wireless communication network 400 (for example, the Wireless USB device 412), the Wireless USB device 412 cannot receive a beacon. For this reason, the address of the Wireless USB device 403 is not included in the beacon generated by the Wireless USB device 412.

However, if the current transmission power is sufficient to reach the Wireless USB device 412, the Wireless USB device 412 receives a beacon from the Wireless USB device 403.

Having received the beacon, the Wireless USB device 412 then stores the address of the Wireless USB device 403 in the beacon slot occupancy information field included in the beacon it transmits itself. Note that the storage destination at this time is the field in the beacon slot occupancy information included in the beacon transmitted by the Wireless USB device 412 that corresponds to the number of the slot in which the beacon was received from the Wireless USB device 403. The beacon generated in this manner is transmitted from the Wireless USB device 412 to the Wireless USB device 403.

In other words, there are cases where the address of the Wireless USB device 403 is included in the beacon transmitted by the Wireless USB host 401, and cases where the address of the Wireless USB device 403 is not included in the beacon transmitted by the Wireless USB host 401, depending on the transmission power at the time when the beacon is transmitted.

In Step S1106, a beacon transmitted by another wireless terminal is received, and the beacon slot occupancy information included in the beacon transmitted by the other wireless terminal is analyzed.

In Step S1107, it is determined whether or not information related to the Wireless USB device 403 is present in the beacon slot occupancy information. If it is determined that information related to the Wireless USB device 403 is not present in the beacon slot occupancy information, the process advances to Step S1108. If the beacon transmitted by the Wireless USB device 403 has not reached the wireless terminal that transmitted the received beacon, information related to the Wireless USB device 403 is not present.

In Step S1108, the Wireless USB device 403 determines that its own wireless frames are not reaching a wireless terminal in the other wireless communication network 410, and increases its own transmission power by one step. After the transmission power has been increased, the process returns to Step S1105, where a beacon is once again transmitted in an asynchronous BP through the procedure described above.

Thereafter, the processing from Steps S1105 to S1108 is repeated until it has been determined that information related to the Wireless USB device 403 is present in Step S1107.

The transmission power of the Wireless USB device 403 is increased by a step with each repetition of the processing from Steps S1105 to S1108. Eventually, this power will reach a level at which the wireless terminal in the other wireless communication network 410 is able to receive the beacon transmitted by the Wireless USB device 403.

In this case, the information related to the Wireless USB device 403 will be present in the beacon slot occupancy information generated by the wireless terminal in the other wireless communication network 410 that received the beacon from the Wireless USB device 403.

As a result, in Step S1107, it is determined that the information related to the Wireless USB device 403 is present, and the procedure advances to Step S1109. Note that if the transmission power used at this time is employed as-is, the wireless frames transmitted by the Wireless USB device 403 may reach a wireless terminal in the other wireless communication network 410 and interfere therewith.

Accordingly, in Step S1109, a transmission power level one step lower than the current transmission power is employed as the optimum value to apply in the data communication performed thereafter.

Furthermore, in Step S1110, the Wireless USB device 403 sets its own sensitivity to a level at which it will not detect wireless frames transmitted by a wireless terminal in the other wireless communication network 410.

Finally, in Step S1111, the Wireless USB device 403 connects to the Wireless USB host 401 and commences data communication by commencing beacon transmission in a synchronous BP.

As described thus far, the object of the present invention can be achieved not only by using a system by which the Wireless USB device 403 gradually reduces its own transmission power, but also by using a system by which the Wireless USB device 403 gradually increases its own transmission power. Note that an embodiment that combines these two systems also falls within the scope of the present invention.

Third Embodiment

In the above first and second embodiments, the transmission power of the newly-started Wireless USB device 403 is controlled so that the Wireless USB device 403 does not interfere with the other wireless communication network 410. However, with respect to the control of the transmission power, it is necessary not only to reduce the interference with the other wireless communication network 410, but also to secure communication with a desired communication partner station.

For example, there are cases in which it is necessary to prioritize communication with the Wireless USB host 401 depending on the relationship of the distances between the Wireless USB host 401, the Wireless USB device 403, and the Wireless USB device 412. In such a case, the range of the transmission power that can be employed by the Wireless USB device 403 should be limited.

Accordingly, in the present embodiment, the minimum transmission power necessary for the Wireless USB device 403 to maintain communication with the Wireless USB host 401 is specified as a minimum value that can be set, and this value is set as a lower limit value of the transmission power.

The flow of a transmission power control process performed by a tributary station according to the present embodiment in order to avoid interference shall be described hereinafter with reference to FIG. 12.

Figure 12:
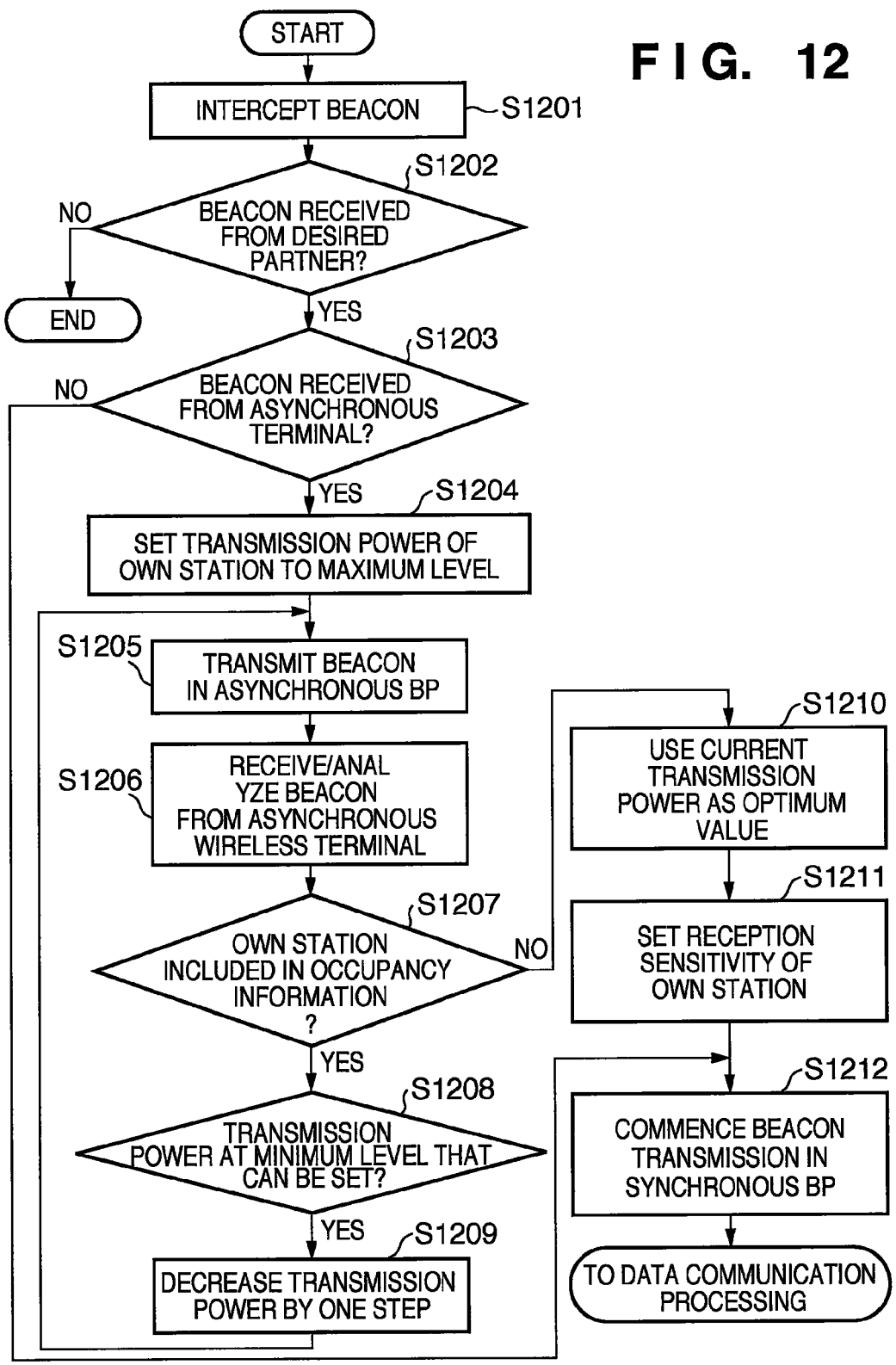
FIG. 12 is a diagram illustrating the flow of a transmission power control process executed by a tributary station according to a third embodiment of the present invention.

The process illustrated in FIG. 12 is executed when the Wireless USB device 403 is started up. In Step S1201, in order to determine whether or not a partner to which it should connect is present, the Wireless USB device 403 first intercepts wireless frames for a set period following startup. The details of all received beacons are analyzed by the beacon analyzing unit 722.

In Step S1202, based on the analysis results, it is determined whether or not a beacon has been received from the desired connection partner (the Wireless USB host 401, in the present embodiment) operating on the wireless communication network 400.

The transmission power control process ends if it has been determined that a beacon has not been received from the Wireless USB host 401 in Step S1202.

However, the process advances to Step S1203 if it has been determined that a beacon has been received from the Wireless USB host 401 in Step S1202.

In Step S1203, it is further determined whether or not a beacon has been received from a wireless terminal belonging to the wireless communication network 410, which is operating asynchronously to the wireless communication network 400. This wireless terminal is, for example, the Wireless USB device 412, in the present embodiment.

If in Step S1203 it has been determined that a beacon has not been received from the Wireless USB device 412, there is no chance of interference with other wireless communication networks, and thus the process advances to Step S1212.

However, if in Step S1203 it has been determined that a beacon has been received from the Wireless USB device 412, there is a chance of interference with other wireless communication networks, and that interference should be avoided; thus, the process advances to Step S1204.

In Step S1204, the MAC protocol processing unit 702 instructs the transmission power adjustment unit 715 to set the transmission power to the maximum level. The MAC protocol processing unit 702 also provides the timing at which to transmit a beacon and information necessary for beacon generation to the beacon generation unit 713.

It should be noted that the timing at which to transmit a beacon is determined by selecting a beacon slot included in an asynchronous BP used by the wireless communication network 410.

In Step S1205, the beacon generation unit 713 generates a beacon using the provided information, and transmits the beacon at the stated transmission timing.

As a result of the processing performed in Step S1205, another wireless terminal belonging to the wireless communication network 410 (for example, the Wireless USB device 412) receives the beacon transmitted by the Wireless USB device 403. The other wireless terminal then stores the address of the Wireless USB device 403 in the beacon slot occupancy information field included in the beacon it transmits itself. Note that the storage destination at this time is the field in the beacon slot occupancy information that corresponds to the number of the slot in which the beacon was received from the Wireless USB device 403. The beacon generated in this manner is transmitted from the Wireless USB device 412 to the Wireless USB device 403.

In Step S1206, a beacon transmitted by another wireless terminal is received, and the beacon slot occupancy information included in the beacon transmitted by the other wireless terminal is analyzed.

In Step S1207, it is determined whether or not information related to the Wireless USB device 403 is present in the beacon slot occupancy information. If it is determined that information related to the Wireless USB device 403 is present in the beacon slot occupancy information, the process advances to Step S1208.

In Step S1208, it is determined whether or not the current transmission power is the minimum value that can be set. As described earlier, the "minimum value that can be set" mentioned here is the minimum transmission power necessary for the Wireless USB device 403 to maintain communication with the Wireless USB host 401.

If in Step S1208 it has been determined that the current transmission power is not the minimum value that can be set, the process advances to Step S1209, and after the Wireless USB device 403 reduces its own transmission power by one step, the process returns to Step S1205. In Step S1205, a beacon is once again transmitted in an asynchronous BP through the procedure described above. Thereafter, the processing from Steps S1205 to S1209 is repeated until it has been determined that information related to the Wireless USB device 403 is not present in Step S1207 or it has been determined that the minimum value that can be set has been reached in Step S1208.

If in Step S1207 it has been determined that information related to the Wireless USB device 403 is not present, the process advances to Step S1210. Alternatively, if in Step S1208 it has been determined that the current transmission power is the minimum value that can be set, the process advances to Step S1210.

In Step S1210, the current transmission power is employed as the optimum value. Furthermore, in Step S1211, the Wireless USB device 403 sets its own sensitivity to a level at which it will not detect wireless frames transmitted by a wireless terminal in the other wireless communication network 410.

Finally, in Step S1212, the Wireless USB device 403 connects to the Wireless USB host 401 and commences data communication by commencing beacon transmission in a synchronous BP.

As described thus far, in the present embodiment, the Wireless USB device 403 sets its own transmission power to a maximum level, reducing it one step at a time thereafter, and when its own beacon cannot be received by another wireless communication network, the Wireless USB device 403 sets that transmission power as the optimum value.

Furthermore, if the transmission power of the Wireless USB device 403 reaches a minimum value before the other wireless communication network becomes unable to receive the beacon of the Wireless USB device 403, the Wireless USB device 403 stops reducing its own transmission power and uses that minimum value as the optimum value. Communication with the Wireless USB host 401 can be maintained as a result.

Therefore, according to the present embodiment, it is possible to reduce interference with another asynchronous network to the greatest degree possible while also securely maintaining communication with a desired communication partner station.

Although in the above descriptions, transmission power control is carried out while gradually reducing the transmission power of the Wireless USB device 403, it should be noted that the transmission power control may be carried out while gradually increasing the transmission power instead.

In such a case, the minimum transmission power level indicated in Step S1104 of FIG. 11 as discussed in the second embodiment may be used as the minimum transmission power necessary for the Wireless USB device 403 to maintain communication with the Wireless USB host 401.

Fourth Embodiment

In the above third embodiment, a predetermined minimum value is employed as the transmission power level by which communication with a desired communication partner station can be secured. However, the present invention is not limited thereto. For example, a process that measures the minimum value that can be set may be executed at startup prior to execution of the stated transmission power control process.

Figure 13:
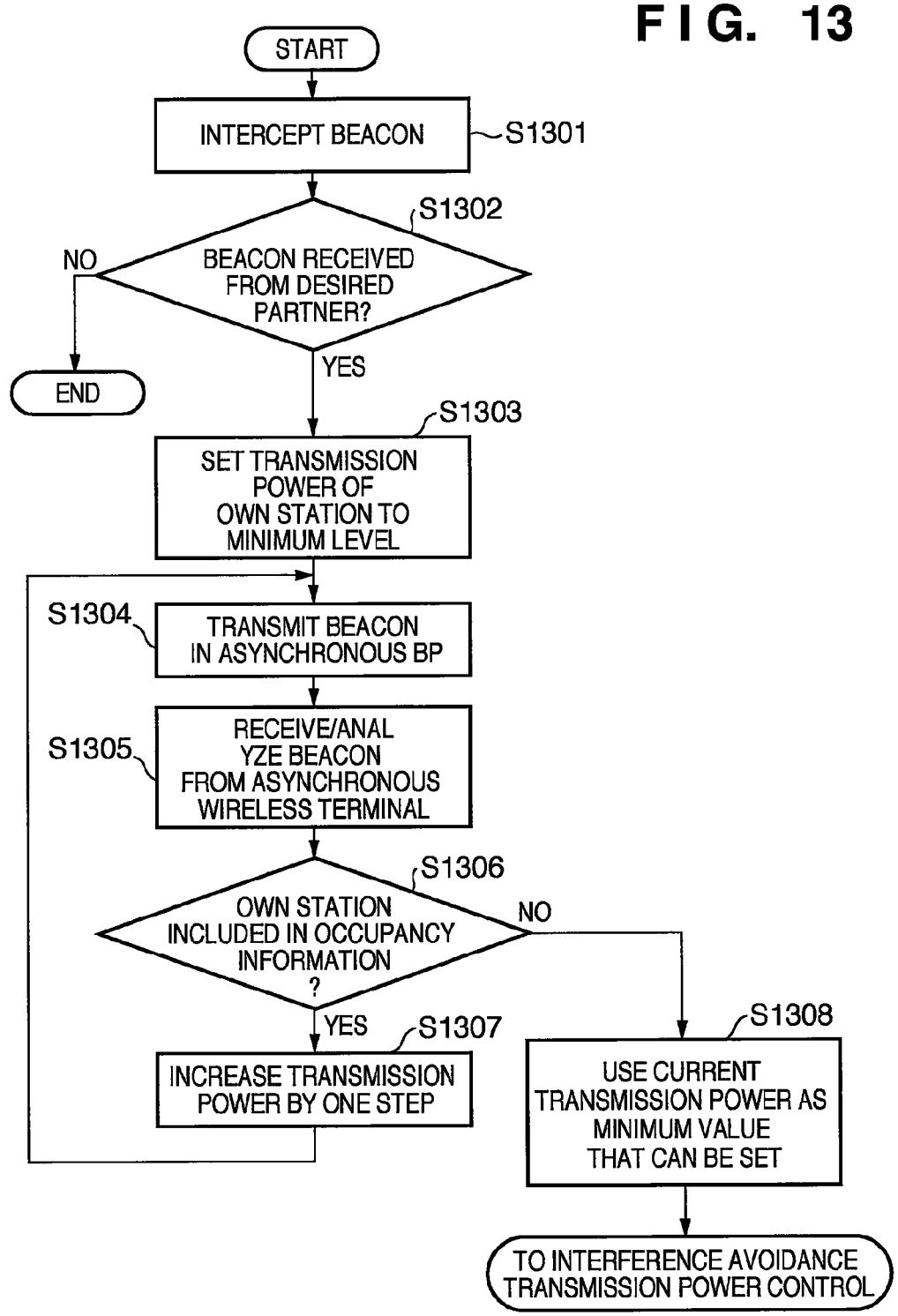
FIG. 13 is a diagram illustrating the flow of a process for measuring the minimum transmission power value necessary for a tributary station to secure communication with a desired communication partner station.

FIG. 13 is a diagram illustrating the flow of a process for measuring the minimum value for securing communication with a desired communication partner station. The process illustrated in FIG. 13 is executed when the Wireless USB device 403 is started up. In Step S1301, in order to determine whether or not a partner to which it should connect is present, the Wireless USB device 403 first intercepts wireless frames for a set period following startup. The details of all received beacons are analyzed by the beacon analyzing unit 722.

In Step S1302, based on the analysis results, it is determined whether or not a beacon has been received from the desired connection partner (the Wireless USB host 401, in the present embodiment) operating on the wireless communication network 400.

The process for measuring the minimum value ends if it has been determined that a beacon has not been received from the Wireless USB host 401 in Step S1302.

However, the process advances to Step S1303 if it has been determined that a beacon has been received from the Wireless USB host 401 in Step S1302.

In Step S1303, the Wireless USB device 403 sets its own transmission power to a minimum level. Note that the "minimum level" mentioned here is the minimum level to which the transmission power of the Wireless USB device 403 can physically be set.

In Step S1304, a beacon is transmitted in a synchronous BP synchronized with the wireless communication network 400.

Here, if the current transmission power is insufficient to reach a wireless terminal in the wireless communication network 400 (for example, the Wireless USB host 401), the Wireless USB host 401 cannot receive a beacon. For this reason, the address of the Wireless USB device 403 is not included in the beacon generated by the Wireless USB host 401.

However, if the current transmission power is sufficient to reach the Wireless USB host 401, the Wireless USB host 401 receives a beacon from the Wireless USB device 403.

Having received the beacon, the Wireless USB host 401 then stores the address of the Wireless USB device 403 in the beacon slot occupancy information field included in the beacon it transmits itself. Note that the storage destination at this time is the field in the beacon slot occupancy information included in the beacon transmitted by the Wireless USB host 401 that corresponds to the number of the slot in which the beacon was received from the Wireless USB device 403.

In other words, there are cases where the address of the Wireless USB device 403 is included in the beacon transmitted by the Wireless USB host 401, and cases where the address of the Wireless USB device 403 is not included in the beacon transmitted by the Wireless USB host 401, depending on the transmission power at the time when the beacon is transmitted.

In Step S1305, the beacon transmitted by the Wireless USB host 401 is received and analyzed. Then, in Step S1306, it is determined whether or not information related to the Wireless USB device 403 is present in the beacon slot occupancy information included in the beacon transmitted by the Wireless USB host 401.

If in Step S1306 it has been determined that information related to the Wireless USB device 403 is not present in the beacon slot occupancy information, the process advances to Step S1307, where the transmission power is increased by one step, after which the process returns to Step S1304. In Step S1304, a beacon is once again transmitted in the synchronous BP through the procedure stated above, and the processing from Steps S1304 to S1307 is repeated.

By repeating the processing from Step S1304 to Step S1307, the transmission power of the Wireless USB device 403 is gradually increased, eventually reaching a level at which reception by the Wireless USB host 401 is possible.

As a result, information related to the Wireless USB device 403 is present in the beacon slot occupancy information included in the beacon transmitted by the Wireless USB host 401. The transmission power at this time is the minimum transmission power level necessary for the Wireless USB host 401 to receive the wireless frames transmitted by the Wireless USB device 403.

Therefore, in Step S1308, the current transmission power is employed as the minimum value that can be set.

The above process makes it possible to set the minimum value for securing communication with a desired communication partner station.

Note that the process of FIG. 12, described in the third embodiment, is executed after the abovementioned process. In this case, the minimum value that can be set, as indicated in Step S1208, is the minimum value found through the process of FIG. 13. Furthermore, this minimum value can also be used as the minimum value when carrying out transmission power control while gradually increasing the transmission power.

In this case, the minimum level of the transmission power, as indicated in Step S1104 of FIG. 11 described in the second embodiment, is the minimum value found through the process of FIG. 13.

Other Embodiments

Note that the present invention may be applied in a system configured of a plurality of devices (for example, a host computer, an interface device, a reader, a printer, and so on), or may be applied in an apparatus configured of a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiments has been stored. In such a case, the above functions are implemented by a computer (or CPU or MPU) of the system or apparatus reading out and executing the program code stored in the storage medium. Note that in such a case, the present invention is configured of the storage medium in which the program code is stored.

A Floppy® disk, a hard disk, an optical disk, a magneto-optical disk, a CD-ROM, a CD-R, magnetic tape, a non-volatile memory card, a ROM, and the like are examples of storage media that can be used to supply the program code.

However, the invention is not intended to be limited to the case where the functions of the aforementioned embodiments are implemented by a computer executing the read-out program code. That is, it goes without saying that the case where, for example, an operating system (OS) or the like running in a computer performs part or all of the actual processing based on instructions in the program code, and the functions of the aforementioned embodiments are realized by that processing, is included in the scope of the present invention.

Furthermore, the case where the functions of the aforementioned embodiments are implemented after the program code read out from the storage medium has been written into a memory provided in a function expansion board installed in the computer or a function expansion unit connected to the computer is also included within the scope of the present invention. In other words, the case where, after the program code has been written into a memory, a CPU or the like included in the expansion board or expansion unit performs all or part of the actual processing based on instructions included in the program code, and the functions of the aforementioned embodiment are implemented through that processing, also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2007-211502 filed on Aug. 14, 2007, which is hereby incorporated by reference herein in its entirety.

What is claimed is:

1. A communication apparatus which communicates with a first communication apparatus in a first network, comprising:
   a transmission unit configured to transmit a first signal to a second network in the case of receiving a second signal from a second communication apparatus of the second network;
   a receiving unit configured to receive a third signal from the second communication apparatus after the transmission unit transmits the first signal;
   a determination unit configured to determine whether or not the first signal transmitted by the transmission unit has been received by the second communication apparatus of the second network, based on the third signal received by the receiving unit; and
   a transmission adjustment unit configured to adjust the transmission power of the transmission unit in order to avoid interference with the second network, based on the result of the determination performed by the determination unit.

2. The communication apparatus according to claim 1, wherein the transmission unit is operable to transmit the first signal at a timing based on the second signal received from the second network.

3. The communication apparatus according to claim 1, wherein the transmission adjustment unit is operable to adjust the transmission power of the transmission unit to decrease until the determination unit determines that the first signal transmitted by the transmission unit is not being received by second communication apparatus.

4. The communication apparatus according to claim 1, wherein the transmission adjustment unit is operable to adjust the transmission power of the transmission unit to increase until the determination unit determines that the first signal transmitted by the transmission unit has been received by the second communication apparatus.

5. The communication apparatus according to claim 1, wherein the transmission adjustment unit is operable to adjust the transmission power by using, as a lower limit value, the transmission power level necessary for communicating with the first communication apparatus in the first network to which the communication apparatus belongs.

6. The communication apparatus according to claim 1, wherein the communication apparatus is operable to communicate with the first communication apparatus in the first network to which the communication apparatus belongs using the transmission power adjusted by the transmission adjustment unit.

7. A communication control method for a communication apparatus which communicates with a first communication apparatus in a first network, the method comprising:
   transmitting a first signal to a second network in the case of receiving a second signal from a second communication apparatus of the second network;
   receiving a third signal from the second communication apparatus after the first signal is transmitted in the transmitting step;
   determining whether or not the first signal transmitted in the transmitting step has been received by the second communication apparatus of the second network, based on the third signal received in the receiving step; and
   adjusting the transmission power in the transmitting step in order to avoid interference with the second network, based on the result of the determination performed in the performing step.

8. A non-transitory computer readable medium encoded with a computer readable program which, when executed by a processor, will cause a computer to execute the communication control method according to claim 7.

9. A communication apparatus which communicates with a first communication apparatus in a first network, comprising:
   transmission means for transmitting a first signal to a second network in the case of receiving a second signal from a second communication apparatus of the second network;
   a receiving means for receiving a third signal from the second communication apparatus after the transmission means transmits the first signal;
   determination means for determining whether or not the first signal transmitted by the transmission means has been received by the second communication apparatus of the second network, based on the third signal received by the receiving means; and
   transmission adjustment means for adjusting the transmission power of the transmission means in order to avoid interference with the second network, based on the result of the determination performed by the determination means.

10. The communication apparatus according to claim 9, wherein the transmission means is operable to transmit the first signal at a timing based on the second signal received from the second network.

11. The communication apparatus according to claim 9, wherein the transmission adjustment means is operable to adjust the transmission power of the transmission means to decrease until the determination means determines that the first signal transmitted by the transmission means is not being received by the second communication apparatus.

12. The communication apparatus according to claim 9, wherein the transmission adjustment means is operable to adjust the transmission power of the transmission means to increase until the determination means determines that the first signal transmitted by the transmission means has been received by the second communication apparatus.

13. The communication apparatus according to claim 9, wherein the transmission adjustment means is operable to adjust the transmission power by using, as a lower limit value, the transmission power level necessary for communicating with the first communication apparatus in the first network to which the communication apparatus belongs.

14. The communication apparatus according to claim 9, wherein the communication apparatus is operable to communicate with the first communication apparatus in the first network to which the communication apparatus belongs using the transmission power adjusted by the transmission adjustment means.

* * * * *